(12) United States Patent
Kirkengen et al.

(10) Patent No.: US 12,451,488 B2
(45) Date of Patent: Oct. 21, 2025

(54) METHOD FOR PRODUCING A SILICON NITRIDE POWDER AND BATTERY COMPRISING THE POWDER

(71) Applicant: Institutt for energiteknikk, Kjeller (NO)

(72) Inventors: Martin Kirkengen, Oslo (NO); Asbjorn Ulvestad, Kjeller (NO); Hanne F Andersen, Kjeller (NO); Werner Filtvedt, Tomter (NO); Arve Holt, Leirsund (NO); Hallgeir Klette, Kjeller (NO); Trygve Mongstad, Kjeller (NO); Jan Petter Maehlen, Kjeller (NO); Ornulf Nordseth, Kjeller (NO); Thomas Preston, Kjeller (NO)

(73) Assignee: INSTITUTT FOR ENERGITEKNIKK, Kjeller (NO)

( * ) Notice: Subject to any disclaimer, the term of this patent is extended or adjusted under 35 U.S.C. 154(b) by 868 days.

(21) Appl. No.: 16/305,429

(22) PCT Filed: May 30, 2017

(86) PCT No.: PCT/EP2017/062963
§ 371 (c)(1),
(2) Date: Nov. 29, 2018

(87) PCT Pub. No.: WO2017/207525
PCT Pub. Date: Dec. 7, 2017

(65) Prior Publication Data
US 2020/0067092 A1     Feb. 27, 2020

(30) Foreign Application Priority Data
May 31, 2016   (NO) ..................... 2016930

(51) Int. Cl.
*H01M 4/58* (2010.01)
*C01B 21/068* (2006.01)
(Continued)

(52) U.S. Cl.
CPC ........... *H01M 4/58* (2013.01); *C01B 21/0682* (2013.01); *H01M 4/366* (2013.01);
(Continued)

(58) Field of Classification Search
CPC .... H01M 4/58; H01M 4/366; H01M 10/0525; H01M 10/049; H01M 10/0567;
(Continued)

(56) References Cited

U.S. PATENT DOCUMENTS

| 4,314,525 A | 2/1982 | Hsu et al. |
| 2009/0181304 A1* | 7/2009 | Miyamoto ............. H01M 4/58 252/182.1 |

(Continued)

FOREIGN PATENT DOCUMENTS

| EP | 0219764 | 4/1987 |
| EP | 0618171 | 10/1994 |

(Continued)

OTHER PUBLICATIONS

Guzman et al ("High capacity silicon nitride-based composite anode for lithium ion batteries" J. Mater. Chem. A. 2014, 2, p. 14577-14584).*

(Continued)

*Primary Examiner* — Stephen J Yanchuk
(74) *Attorney, Agent, or Firm* — Meunier Carlin & Curfman LLC (57) ABSTRACT

Method for producing a powder comprising particles (26) comprising amorphous, micro- or nano-crystalline Silicon nitride. The method comprises the steps of supplying a reactant gas (12) containing Silicon, and a reactant gas (12)

(Continued)

containing Nitrogen, to a reaction chamber (16) of a reactor (10), and heating said reactant gases (12) to a temperature in the range of 510° C. to 1300° C. which is sufficient for thermal decomposition or reduction of the reactant gases (12) to take place inside the reaction chamber (16) to thereby produce a powder of amorphous, micro- or nano-crystalline particles (26) comprising Silicon nitride (SiNx) in which the atomic ratio of Silicon to Nitrogen is in the range 1:0.2 to 1:0.9. The produced powder of particles (26) may be used to produce a film, an electrode, such as an anode, for a battery, such as a Lithium ion battery.

7 Claims, 5 Drawing Sheets

(51) Int. Cl.
*H01M 4/36* (2006.01)
*H01M 10/0525* (2010.01)
*H01M 4/02* (2006.01)

(52) U.S. Cl.
CPC ..... *H01M 10/0525* (2013.01); *C01P 2002/52* (2013.01); *C01P 2004/03* (2013.01); *C01P 2004/32* (2013.01); *C01P 2004/64* (2013.01); *C01P 2006/40* (2013.01); *H01M 2004/027* (2013.01)

(58) Field of Classification Search
CPC .......... H01M 2004/027; C01P 2004/03; C01P 2004/32; C01P 2004/64; C01P 2002/52; C01P 2004/61; C01P 2004/84; C01P 2006/40; H10M 4/58; H10M 4/366; C01B 21/0682; C23C 16/0209; C23C 16/0218; C23C 16/0236; C23C 16/22; C23C 16/30; C23C 16/30334; C23C 16/345; C23C 16/4417; C23C 16/455; C23C 16/45519; C23C 16/45521; Y02E 60/10
See application file for complete search history.

(56) References Cited

U.S. PATENT DOCUMENTS

| | | |
|---|---|---|
| 2013/0113034 A1 | 5/2013 | Zama |
| 2015/0194668 A1* | 7/2015 | Ueda ..................... H01M 4/386 |
| | | 429/231.4 |
| 2015/0280222 A1 | 10/2015 | Kirkengen |
| 2018/0083263 A1* | 3/2018 | Cho ...................... H01M 4/625 |
| 2018/0309160 A1* | 10/2018 | Kizaki ................. H01M 4/386 |

FOREIGN PATENT DOCUMENTS

| | | | |
|---|---|---|---|
| EP | 1149934 | | 10/2001 |
| JP | 19840048374 | | 10/1985 |
| JP | H0127773 | | 5/1989 |
| WO | WO2014060535 | | 4/2014 |
| WO | WO 2017-164702 | * | 9/2017 .............. B60L 50/50 |

OTHER PUBLICATIONS

Yamazaki et al. (Silicon Nitride Prepared by SiH4—NH3 Reaction with Catalysts. Japanese Journal of Applied Physics. vol 9, No. 12. Dec. 1970. p. 1467-1477).*
Nilsen et al., Atomic layer deposition of functional films for Li-ion microbatteries, Phys. Status Solidi A 211, No. 2, 357-367 (2014).
Suzuki et al., Silicon nitride thin film electrode for lithium-ion batteries, J. of Power Sources, vol. 231 (2013) 186-189.
Prochazka et al., Synthesis and characterization of a pure silicon nitride powder, Amer. Ceramic Society Bull., vol. 57, No. 6, Jan. 1, 1978, 579-581, 586.
Janiga et al., Synthesis of silicon nitride by gas-phase reaction, J. of European Ceramic Society, vol. 8 (1991) 153-160.
Ahn et al., The effect of nitrogen on the cycling performance in thin-film SiN anode, J. of Solid State Chem., vol. 181, No. 9, Sep. 1, 2008, 2139-2142.
Gebhardt et al., Chemical vapor deposition of silicon nitride, J. of Electrochem. Society, vol. 123, No. 10, Oct. 1, 1976, 1578-1582.
Martin-Gil et al., Mechanical grinding of Si3N4 to be used as an electrode in lithium batteries, Materials Letter, vol. 57 (2003) 3063-3069.
Zhang et al., Si—Si3N4 composites as anode materials for lithium ion batteries, Solid State Ionics, vol. 178 (2007) 1107-1112.

* cited by examiner

METHOD FOR PRODUCING A SILICON NITRIDE POWDER AND BATTERY COMPRISING THE POWDER

TECHNICAL FIELD

The present invention concerns a method for producing a powder comprising particles comprising amorphous, micro- or nano-crystalline Silicon nitride suitable for a battery. The present invention also concerns a powder produced using such a method and a film made from such a powder. The present invention even concerns an electrode made from such a powder and/or at least one such film and a battery, such as a Lithium ion battery, comprising such powder and/or at least one such film and/or at least one such electrode.

BACKGROUND OF THE INVENTION

Electrochemical batteries for energy storage can be produced in many ways. Currently, the battery chemistry which has been seeing the fastest growth is the Lithium-ion battery. The key elements of this technology are the anode electrode, the cathode electrode, the electrolyte connecting the two electrodes internally inside the battery, and the current collectors providing the external connection. During the charge and discharge of the battery, Lithium ions diffuse through the electrolyte from the cathode material to the anode material and back. To preserve the electric charge of the battery, a current of electrons is established through the current collectors to balance the transport of the positively charged Lithium-ion transport.

An electrode usually takes the shape of a film comprising the active material that interacts with the Lithium, a binder ensuring the adhesion of the active material to the electrode, and sometimes a conductive powder like graphite to provide extra electron conductivity within the electrode. The active material can typically be introduced into a battery in the form of a powder.

Silicon is in general considered to be a very promising anode material for Lithium ion batteries due to its very high theoretical Lithium-absorption capacity of up to 4.2 Lithium atoms per Silicon atom. However, Silicon expands by up to 400% during the absorption of Lithium, meaning that for each cycle of charging and discharging of the battery, the Silicon will expand and contract, often at different rates in different parts of the same electrode. This can cause cracking of the Silicon particles, which exposes a new surface for interactions with the electrolyte, and reduces the internal electron conductivity of the particles to the extent that some parts of the particle can become disconnected from the conductive network of the battery electrode. In addition to the reported cracking, it has been reported by the inventors of the present invention that fully lithiated Silicon seems to become highly mobile, and re-organizes itself into new structures according to the Lithium flows during lithiation and de-lithiation of the electrodes. This continuously exposes new surfaces to the electrolyte, and after long cycling, the surface to volume ratio of the Silicon can rise to extreme values.

When embedded in a battery electrolyte, a Silicon surface will react chemically to produce a solid-electrolyte-interface (SEI) layer. During the cycling of the battery, this layer has been known to peel off, thereby exposing a clean surface, forming a new SEI-layer and in this way consuming the electrolyte and degrading the battery. In particular, the degradation mechanisms described above will lead to very large surface areas with SEI-layer formation, and will correspondingly result in a large amount of electrolyte being degraded.

Many prior art documents and studies have addressed these problems by coating the Silicon. US patent application no. US 2015/280222 discloses that the expansion of Silicon will however break most coatings applied thereto, leading to fresh Silicon surfaces being exposed. The high mobility of lithiated Silicon will then lead to this fresh surface dominating further lithiation, and thereby degradation behavior. Sometimes it is attempted to mitigate the cracking by only partially lithiating an electrode, but this can lead to inhomogeneous lithiation as some particles experience high local resistance and are not lithiated as intended, while other particles are fully lithiated and thereby degrade more rapidly.

Another attempt to reduce the effect of the Silicon expansion is by buffering it in composites in which grains of Silicon are mixed with grains of metal, Carbon or inert material. These systems can still suffer from the problem of Silicon migration, where the fully lithiated Silicon gathers into larger grains over time, creating the same problems as described above.

As an alternative to using pure Silicon, a number of prior art documents propose other materials including Silicon nitride. Silicon nitride is variably referred to as a solid electrolyte, an active material or an inert addition, indicating the lack of experience in using this material in batteries. In many cases it is proposed to mix Silicon compounds with metal Nitrides into composite materials, although such a mixture should not be confused with actual Silicon nitride material. Lithium Nitride is known to be a good lithium conductor, but is reported to be unstable in air.

SUMMARY OF THE INVENTION

An object of the present invention is to provide an improved method for producing a powder comprising particles comprising amorphous, micro- or nano-crystalline Silicon nitride, i.e. particles having a maximum transverse dimension of up to 100 μm, which powder is suitable for use in applications such as making an electrode for a battery, such as a Lithium ion battery.

The method comprises the steps of supplying a reactant gas containing Silicon, and a reactant gas containing Nitrogen, to a reaction chamber of a reactor, such as a one-stage CVD Free Space Reactor, and heating the reactant gases to a temperature in the range of 510 to 1300° C., which is sufficient for thermal decomposition or reduction of the reactant gases to take place inside the reaction chamber to thereby produce a powder of amorphous, micro- or nano-crystalline particles comprising Silicon nitride ($SiN_x$) in which the atomic ratio of Silicon to Nitrogen is in the range 1:0.2 to 1:0.9.

According to an embodiment of the invention the Silicon nitride in the particles has a chemical formula of $SiN_x$ where $0.2 \leq x < 0.9$. The produced particles namely comprise Silicon and Nitrogen in the ratio 1:x and optionally other elements.

Large quantities of such high purity amorphous, micro- or nano-crystalline Silicon nitride particles having a narrow size distribution (i.e. substantially monodisperse) may thereby be produced in a controlled manner. The method therefore provides a high yield of homogeneous particles whereby no extra step, such as filtering, is required to ensure that a desired standard deviation in size distribution is achieved. The produced powder comprises particles with a smooth surface, i.e. the particles have an outer surface that is free from irregularities, roughness and projections when viewed at a maximum resolution of a Scanning Electron Microscope (SEM), i.e. a spatial resolution less than 100 nm.

Additionally, since the method results in the production of particles having a spherical or substantially spherical shape, the handling of the produced powder is facilitated. The expression "substantially spherical" refers to a degree of deviation from "spherical" that is sufficiently small so as to not measurably detract from the identified properties of the particles.

According to an embodiment of the invention Silicon and Nitrogen are distributed evenly through each produced particle.

Furthermore, if the Silicon nitride particles are used in a battery, such as for the anode of a Lithium ion battery, SEI-layer formation and electrolyte consumption will be reduced due to the stability of the active material. The uniform size distribution contributes to better control in the charging and discharging of individual particles. In particular, during partial lithiation in normal operations, as opposed to the repeated full lithiation in typical lifetime testing, differences in particle size will result in differences in degradation. With large size variations, some particles will be fully lithiated while other particles are still far from saturated. Thus the strain and degradation of the smallest particles will be unnecessarily large.

Since the powder produced by the method according to the present invention is made from gas precursors, the inclusion of Oxygen in the core region of the particles constituting the powder may be avoided or reduced to a minimum depending on the purity of the gases supplied to the reactor. The inclusion of Oxygen can therefore be carefully controlled so that there may be no, or very little Silicon Oxide in an anode for example, which is desirable. The nitride also slows the onset of surface oxidation.

It should be noted that the particles produced by the method according to the present invention may contain Oxygen which may originate from humidity that has not fully been removed from one or more of the reactant gases. The particles produced by the method according to the present invention may alternatively or additionally contain Carbon. The presence of Oxygen and/or Carbon in the particles will result in a corresponding decrease in the Nitrogen content of the particles.

According to an embodiment of the invention the chemical composition is represented by the chemical formula $SiN_x$ where $0.2 \leq x < 0.8$, $0.2 \leq x < 0.7$, or where $0.4 \leq x < 0.8$ or where $0.6 \leq x < 0.8$. It has been found that $SiN_x$ with $x<0.2$ shows excellent Lithium-absorption capacity, but suffers from degradation, with a Coulombic efficiency of less than 99%. The degradation is slower than for pure Silicon, but still too large for most commercial applications. The value of x is tuned to the Lithium-absorption capacity desired for a particular application, such as for an electrode in which a trade-off between the conductivity of the particles, the Lithium-absorption capacity of the particles, the expansion of the particles and the first cycle irreversible capacity of the particles needs has to be reached.

The first cycle specific charge capacity (i.e. the first cycle reversible capacity plus the first cycle irreversible capacity) of different Silicon nitride compositions shows an approximately linear dependency on the atomic percentage of Silicon, decreasing from 3372±112 mAh/g for pure Silicon to 1166±11 mAh/g for SiN. The benefit to the total battery capacity obtained by increasing the anode capacity depends heavily on the cathode capacity. Better cathodes see greater benefits from improved anodes. Thus the commercial benefit of increasing battery capacity will have to be considered in each individual case.

The initial lithiation of Silicon nitride will leave Lithium trapped both in certain states in the bulk of the material, and at the surface of the particles. Increasing particle size will allow a reduction of the irreversible capacity related to the surface reaction. The bulk trapping of Lithium is directly related to the amount of Nitrogen in the particles, and by reducing the Nitrogen content in the particles, first cycle irreversible capacity is reduced, while the cyclable capacity is increased.

By comparing the first cycle irreversible capacities of SiN films with different thicknesses (40 nm, 80 nm, 120 nm, 160 nm, and 200 nm), it has been determined that the conversion reaction of the Silicon nitride chemical composition according to the present invention consumes approximately 565 mAh/g, while the initial formation of an SEI-layer consumes 0.021 mAh/cm$^2$. These experiments also demonstrated that increasing the thickness of SiN films had no significant adverse effects on their performance, but rather improved the first cycle irreversible capacity and increased the long term (cycles 10-100) average Coulombic efficiency from 99.6% (40 nm) to >99.9% (80 nm, 120 nm, 160 nm and 200 nm).

In the following, the irreversible capacity from the conversion reaction will be termed the 'bulk irreversible capacity', measured in mAh/g, while the Lithium loss attributed to the SEI-layer formation will be termed 'surface irreversible capacity', measured in mAh/cm$^2$. The bulk irreversible capacity is a measure of the amount of Lithium the $SiN_x$ powder can safely contain without being hazardous in production processes.

The method according to the present invention may be carried out in a Free Space Reactor using a Chemical Vapour Deposition (CVD) process to produce Silicon nitride. Chemical Vapour Deposition is a chemical process used to produce high-purity, high-performance solid materials. Chemical vapour deposition needs to be conducted inside a reaction chamber, but the deposition itself occurs favorably at Silicon nitride nuclei formed in the gas phase and not on the reactor walls. The powder formed has an amorphous, a micro- or nano-crystalline structure depending on operating conditions.

Apart from US patent application no. US 2015/280222, there seem to be very few, if any, prior art documents that specify any advantages of using amorphous Silicon rather than crystalline Silicon. The amorphous material has a disadvantage in the wide distribution of energy states, leading to a reduction in energy efficiency of the battery—this is also known from amorphous Carbon electrodes. The advantage of the amorphous Silicon is that there is a multitude of diffusion paths available, and the clear two-phase behaviour seen in lithiation of crystalline Silicon is removed.

According to an embodiment of the invention the method comprises the step of supplying at least one gas containing a metal, such as Copper or Iron, such as a metal-organic precursor gas, to the reaction chamber of the reactor, for example during the formation of the core region Silicon particles. Adding a metallic compound to the core region in this way can improve the electrical conductivity of the particles and reduce cracking of the particles. The best results are obtained if the metal forms segregated networks in the particles, meaning that the metal content should be above the solubility limit of the metal in Silicon.

According to an embodiment of the invention the method comprises the step of supplying at least one gas containing Lithium to the reaction chamber of the reactor to lithiate the particles.

Due to the band gap of pure Silicon nitride, it can be difficult to achieve the initial lithiation of Silicon nitride particles when these particles are to be used in a Lithium-ion battery. Three innovations are proposed by the inventors to mitigate this. Firstly, it is suggested to keep the concentration of Nitrogen low, i.e. lower than the atomic concentration of Silicon, to improve conductivity. Secondly, it is proposed that the powder should have an amorphous, micro- or nano-crystalline morphology, to improve lithiation homogeneity and reduce the stresses in the particles during lithiation. Thirdly, it is proposed to form an intermediate layer on the particle surface where the electrochemical transition from Li↔Li++e− can occur outside the Silicon nitride before the Lithium atom diffuses into the Silicon nitride, reducing the importance of the electric conductivity of the Nitride.

Pre-lithiating the particles by supplying at least one gas containing Lithium to the reaction chamber of the reactor will improve battery performance if the particles are used in a battery, such as a Lithium ion battery. Potential precursors include, but are not limited to, lithium trimethylsilane, lithium tert-butoxide or lithium bis(trimethylsilyl)amide. Including Lithium in the particle before submersing the particles in electrolyte is namely advantageous since it reduces electrolyte consumption during initial battery cycles, and reduces the need for time-consuming battery cycling for stabilization in a factory to obtain an equilibrium condition prior to the use of the battery. Also, a coating can then be formed on the particle while the particle has a size closer to the average size it will have in operations, reducing strain in the SEI-layer.

Furthermore, since Lithium-Silicon mixtures are initially amorphous, the amorphous, micro- or nano-crystalline nature of coated particles is likely to speed up the kinetics of charging a battery with Lithium. It is more difficult for cracks to propagate through amorphous material, and the internal strain between different regions of the powder with different Lithium contents will be lower if all areas are amorphous, or at least microcrystalline.

According to an embodiment of the invention the method comprises the step of adding Lithium to the particles so that the particles have a Lithium content in the range of 0 to 350 atomic-percent. According to an embodiment of the invention the Lithium content matches the bulk irreversible capacity of the material. This bulk irreversible capacity has been found to be approximately proportional to the Nitrogen content, and the appropriate amount of Lithium to add has been found to be in the range of $0.5x<y<2.0x$ for $Li_ySiN_x$.

According to an embodiment of the invention the method comprises the step of pre-heating the reactant gases to a temperature below the reaction temperature, i.e. within 10° C., 20° C., 30° C., 40° C., 50° C., 60° C., 70° C., 80° C., 90° or 100° C. of the reaction temperature before the reactant gases are supplied to the reaction chamber of the reactor. This has been found to improve size control probably as it results in providing a more homogeneous temperature in the reaction chamber and in the production of particles having a very narrow particle size distribution.

According to an embodiment of the invention comprises the particles have a maximum transverse dimension up to 100 μm or 2 nm-10 μm or 10 nm-10 μm or less than 10 μm or less than 1 μm in their coated and uncoated state.

According to an embodiment of the invention comprises the Silicon-containing reactant gas comprises at least one of the following: a silane, monosilane, dichlorosilane, trichlorosilane, or a Silicon halide, such as Silicon tetrachloride.

According to an embodiment of the invention comprises the Nitrogen-containing reactant gas comprises at least one of the following: ammonia, Nitrogen.

It should be noted that the expression "reactant gas" as used in this document need not necessarily mean that a reactant gas comprises just one gas. A reactant gas may comprise one or more Silicon- or Nitrogen-containing gases and even one or more other gases, such as a catalyst gas or a dopant gas.

According to an embodiment of the invention the method comprises the step of supplying at least one dopant gas to the reaction chamber of the reactor to dope the particles. By doping the particles, both the electron mobility and the Lithium mobility can be improved. In addition, the doping can be optimized to give the right band bending in the interface between a particle and an SEI-layer, so that no tunneling barrier is introduced.

According to an embodiment of the invention comprises the dopant gas contains at least one of the following: Phosphorus, Boron, Arsenic, Gallium, Aluminium.

According to an embodiment of the invention at least one wall of the reaction chamber is at least partly constituted by a porous membrane and said method comprises the step of supplying a primary gas through the porous membrane to provide a protective inert gas boundary at said at least one wall of the reaction chamber to minimize or prevent the deposition of produced particles on the porous membrane while the reactor is use. This is especially interesting for industrial scale production.

According to an embodiment of the invention the method comprises the step of collecting the produced particles using at least one of the following a filter, gravitational separation, electrostatic forces.

According to an embodiment of the invention the method comprises the step of heat treating said particles after their production, in an inert atmosphere or hydrogen-containing atmosphere so as not to oxidise the particles. The powder of particles produced by the method according to the present invention contains a large amount of Silicon as compared to stoichiometric $Si_3N_4$. By carrying out this optional post-processing step after the particle formation process. nano-domains of Silicon will start to precipitate. If enough Silicon is available, the nano-domains will be linked together in a 3D-network. Substantially all of the Silicon surfaces will then be protected by a near stiochiometric $SiN_x$ matrix. This is very similar to the well-known process of formation of Silicon quantum dots in solar cells devices. The post-production heat treatment step facilitates the production of powder that is homogenous on a length scale of >10 nm or on a length scale of >2 nm, while creating a self-assembled nanostructure (i.e. nano-domains) on shorter length scales. The post processing heat treating step may be conducted in-line with the particle formation method or as a separate batch processing step. The heat treatment may be conducted using Infra-red (IR) or standard resistance heating means. Furthermore, the post-production heat treatment step drives hydrogen out of the produced particles and reorganizes the particles.

According to an embodiment of the invention comprises the method comprises the step of coating the amorphous, micro- or nano-crystalline Silicon nitride particles with at least one passivating material, to obtain a powder of coated particles comprising a core region and a shell region, wherein the core region comprises amorphous, micro- or nano-crystalline Silicon nitride and the shell region comprises at least one passivating material. Lithium may be added to the core region of coated particles so that the core region has a Lithium content in the range of 0 to 350 atomic-percent of the core region's Silicon content.

The present invention also concerns a powder comprising particles comprising amorphous, micro- or nano-crystalline silicon nitride produced using a method according to the present invention. The powder comprises amorphous, micro- or nano-crystalline particles comprising Silicon nitride ($SiN_x$) in which the atomic ratio of Silicon to Nitrogen is in the range 1:0.2 to 1:0.9.

According to an embodiment of the invention the Silicon nitride in said particles has a chemical formula of $SiN_x$ where $0.2 \leq x < 0.8$, or where $0.2 \leq x < 0.7$, or where $0.2 \leq x < 0.6$, or where $0.2 \leq x < 0.5$, or where $0.3 \leq x < 0.9$, or where $0.4 \leq x < 0.9$ or $0.5 \leq x < 0.9$ where $0.6 \leq x < 0.9$. For example, x may be 0.88. The chemical composition may be determined using Energy-dispersive detector (EDS) and Electron energy loss spectroscopy (EELS) analysis.

According to an embodiment of the invention the particles have an outer surface that is free from irregularities, roughness and projections when viewed at a maximum resolution of a Scanning Electron Microscope (SEM), i.e. a spatial resolution less than 100 nm. Cracks in Silicon particles have namely been shown to be initiated from irregularities in the particle surface. The cracks then propagate along grain boundaries, or along preferred crystal orientations. By having particle with a smooth, amorphous, micro- or nano-crystalline outer surface and preferably a substantially spherical shape, the likelihood of producing suitable nucleation points for cracks is substantially reduced, thereby delaying cracking tendency, or increasing the particle size fluctuation that can be allowed before cracks are induced.

According to an embodiment of the invention the particles comprise at least one of the following: a metal, such as Lithium, Oxygen, Carbon. For example, 1-10 atomic-% or less than 1 atomic-% of the Nitrogen in the particles is replaced with Carbon or Oxygen. According to an embodiment of the invention the produced particles can comprise up to 20% of elements other than Silicon and Nitrogen.

According to an embodiment of the invention the concentration of Lithium matches the bulk irreversible capacity of a Silicon nitride constituted by the same relative amounts of Silicon and Nitrogen. The powder namely contains an amount of Lithium given by the bulk irreversible capacity of the $SiN_x$ powder. By pre-lithiating the $SiN_x$, it will not be necessary to provide cathode capacity corresponding to the irreversible bulk capacity. Only the Lithium for the reversible capacity and the irreversible surface capacity will have to be provided by the cathode powder.

According to an embodiment of the invention uncoated particles have a Lithium content in the range of 0 to 30 atomic-percent. According to another embodiment of the invention coated particles have a Lithium content in the range of 0 to 350 atomic-% of the core region's Silicon content.

According to an embodiment of the invention the particles have a maximum transverse dimension of up to 100 μm or 2 nm-10 μm or 10 nm-10 μm or less than 10 μm or less than 1 μm. Such small particles, if used in a Lithium ion battery, will improve the kinetics of the battery.

According to an embodiment of the invention the amorphous, micro- or nano-crystalline Silicon nitride particles are doped with at least one of the following: Phosphorus, Boron, Arsenic, Gallium, Aluminium.

The present invention also concerns a film that comprises a powder according to any of the embodiments of the present invention.

According to an embodiment of the invention an electrode, such as an anode, for a battery, such as a Lithium ion battery, may be produced using the powder and/or at least one film comprising the powder.

The present invention also concerns a battery, such as a Lithium ion battery that comprises a powder according to any of the embodiments of the present invention and/or at least one film and/or at least one electrode according to any of the embodiments of the present invention.

A battery according to the present invention comprises a powder of particles comprising amorphous, micro- or nano-crystalline Silicon nitride, wherein said amorphous, micro- or nano-crystalline particles comprise Silicon nitride ($SiN_x$) in which the atomic ratio of Silicon to Nitrogen is in the range 1:0.1 to 1:0.9.

According to an embodiment of the invention the particles have a concentration of Lithium matching the bulk irreversible capacity of a Silicon Nitride constituted by the same relative amounts of Silicon and Nitrogen.

According to an embodiment of the invention the amount of Lithium is in the range $0.5x < y < 2.0x$ for $Li_ySiN_x$ According to an embodiment of the invention the particles have a Lithium content in the range of 0 to 30 atomic-percent.

According to an embodiment of the invention the particles have an outer surface that is free from irregularities, roughness and projections when viewed at a maximum resolution of a Scanning Electron Microscope (SEM).

According to an embodiment of the invention the particles further comprise at least one of the following: Oxygen or Carbon.

According to an embodiment of the invention the particles are coated and have a core region comprising amorphous, micro- or nano-crystalline Silicon nitride, and a shell region comprising at least one passivating material.

According to an embodiment of the invention the particles have a Lithium content in the range of 0 to 30 atomic-percent, or a Lithium content in the range of 0 to 350 atomic-percent of a coated particle's core region's Silicon content.

According to an embodiment of the invention the particles have a maximum transverse dimension up to 100 μm.

According to an embodiment of the invention the amorphous or micro- or nano-crystalline Silicon nitride in the particles is doped with at least one of the following: Phosphorus, Boron, Arsenic, Gallium, Aluminium.

According to an embodiment of the invention the particles have a substantially spherical shape According to an embodiment of the invention the battery comprises an electrolyte additive that enhances the first cycle lithiation of the Silicon nitride particles, by providing a surface electrolyte interface layer that facilitates the lithiation of the particles.

According to an embodiment of the invention the electrolyte additive is at least one of the following: FEC (Fluor Ethylene Carbonate), Vinylene Carbonate (VC).

In one embodiment of the invention, an electrolyte additive acting as a surfactant forms an SEI-layer aiding the Lithium insertion. Fluor Ethylene Carbonate (FEC) is used in pure silicon anodes to prevent cracking and degradation. The inventors propose to use FEC to form an intermediate layer where the electrochemical transition from Li↔Li++e− can occur.

According to an embodiment of the invention the battery comprises an electrode comprising the powder of particles.

The present invention also concerns the use of the powder produced using a method according to any of the embodiments of the present invention for an electrode of a battery.

BRIEF DESCRIPTION OF THE DRAWINGS

The present invention will hereinafter be further explained by means of non-limiting examples with reference to the appended schematic figures where.

It should be noted that the drawings have not necessarily been drawn to scale and that the dimensions of certain features may have been exaggerated for the sake of clarity.

DETAILED DESCRIPTION OF EMBODIMENTS

Figure 1:
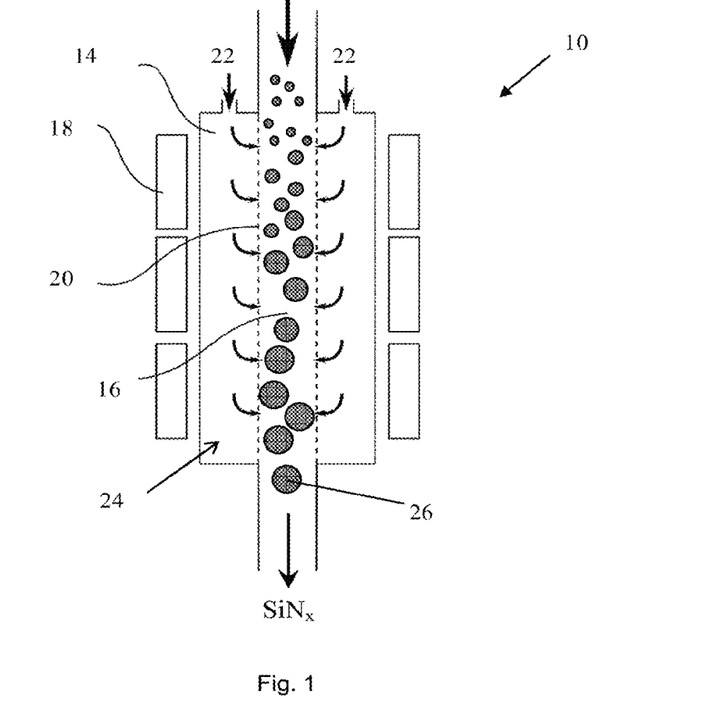
FIG. 1 shows a device for producing amorphous or nano- to micro-scale Silicon nitride particles according to a method according to an embodiment of the invention.

FIG. 1 shows a device 10 for producing a powder comprising amorphous, micro- or nano-crystalline Silicon nitride particles by homogeneous thermal decomposition or reduction of reactant gases 12 containing Silicon and Nitrogen. The device comprises a reactor 14 having a reaction chamber 16 with one or more inlets for the reactant gases 12, located at the top of the device 10 for example to obtain a descending reactant gas flow. The reactor 14 may be a Free Space Reactor having stainless steel, Silicon carbide or quartz walls for example, which is arranged to decompose the reactant gas 12 homogeneously in the gas phase and thus to grow the desired amorphous, micro- or nano-crystalline Silicon nitride particles. Volatile by-products may be removed by gas flow through the reaction chamber 16.

Contrary to the multi-stage reactor disclosed in U.S. Pat. No. 4,314,525, in the device according to the present invention, no seed particles are introduced into the reactor 14. Furthermore, particles are not grown on a substrate, such as a hot substrate or deposited on a wafer, such as a heated wafer, and no salt is used to produce the particles. In the method according to the present invention, deposition is carried out on particles floating in heated gas.

The device 10 also comprises means 18, such as heating coils, which are located around the outer wall of the reactor 14 in the illustrated embodiment, to heat the reactant gases 12 to a temperature in the range of 510 to 1300° C. which is sufficient for thermal decomposition or reduction of the reactant gases 12 to take place inside the reaction chamber 16. The reactant gases 12 are preferably pre-heated to a temperature that is just below the reaction temperature and then, when the reactant gases are in the reaction chamber 16, the temperature inside the reactor 10 provides the energy required so that the particles start forming. This produces particles with a narrow size distribution.

The reaction chamber 16 in the illustrated embodiment is constituted by a single wall constituted entirely by a porous membrane 20, such as a substantially cylindrical tube of material of suitable mechanical and chemical properties. It should be noted that the porous membrane 20 may be of any suitable shape, it may for example be in the form of an upright or inverted cone.

The device 10 may optionally comprise one or more inlets that are arranged to supply a primary gas 22, such as hydrogen or argon, through the porous membrane 20 to provide a protective inert gas boundary at the wall of the reaction chamber 16 to minimize or prevent the deposition of the material on the porous membrane 20 when the device 10 is in use. The one or more inlets may optionally also be used to supply a secondary gas through the porous membrane 20 to influence the thermal decomposition or reduction of the reactant gas 12 inside the reaction chamber 16. The expression "influence the thermal decomposition or reduction of the reactant gas inside the reaction chamber" as used in this document is intended to mean slow down, speed up, prevent, start, modify or change one or more chemical reactions taking place inside the reaction chamber 16. It is not however necessary for a reactor in which a method according to the present invention is carried out to comprise a porous membrane 20.

A Silicon-containing reactant gas 12, such as monosilane ($SiH_4$), diluted in Hydrogen, may be supplied to the reaction chamber 16. Means 18 for heating the reaction chamber 16 raises the temperature of the Silicon-containing reactant gas 12 to a point of thermal decomposition whereby the following reaction takes place and elemental Silicon, is formed:

$$SiH_4 \rightarrow Si + 2H_2$$

For monosilane this temperature is 400° C. The reactant gas 12 may also contain one or more dopant gases, such as arsine, diborane, phosphine, boron trifluoride, Boron-II-trifluoride, trimethylboron or any other metal/organic/inorganic dopant gas, which may for example be added in the particles' nucleation and/or growth phase(s). The reactant gas 12 may for example contain a metal or Lithium-containing gas, which is supplied during the particle nucleation phase, and/or after the particle nucleation phase. Use of Lihitum containing gases for atomic layer deposition is described in e.g. Nilsen, O., Miikkulainen, V., Gandrud, K. B., Østreng, E., Ruud, A., & Fjellvåg, H., (2014), Atomic layer deposition of functional films for Li-ion microbatteries. Physica Status Solidi (A) Applications and Materials Science, 211(2), 357-367. It should be noted that a dopant gas may additionally or alternatively be supplied through the porous membrane 20 in the illustrated embodiment.

A Nitrogen-containing reactant gas 12, such as ammonia, is also supplied to the reaction chamber 16. Means 18 for heating the reaction chamber 16 raises the temperature of the Nitrogen-containing reactant gas 12 to a point of thermal decomposition whereby the following reaction takes place and elemental Nitrogen is formed:

$$2NH_3 \rightarrow 2N + 3H_2$$

Primary gas 22, such as Hydrogen, Nitrogen or Argon is supplied to a chamber 24 outside the reaction chamber 16 that is delimited by the porous membrane wall 20. The reactor 14 is thereby divided into an outer chamber 24 for primary gas 22 and an inner reaction chamber 16 where a decomposition or reduction reaction takes places at a distance from the wall(s) of the reaction chamber 16. The primary gas 22 in the outer chamber 24 is namely arranged to pass through the porous membrane 20 from the outer chamber 24 to the near wall region of the reaction chamber 16. When the primary gas 22 enters the reaction chamber 16, the near wall region will be kept free of reactant gas 12 and thus unwanted wall depositions will be avoided.

Secondary gas may also be supplied to the chamber 24 outside the reaction chamber 16 that is delimited by the porous membrane wall 20. The secondary gas may be added in the particles' nucleation and/or growth phase(s). The secondary gas may for example contain a metal- or Lithium-containing gas, which is supplied through the porous membrane during the particle nucleation phase, and/or after the particle nucleation phase but prior to their exposure to air.

Depending on the operation temperature and requirements for the finished product, the porous membrane 20 may comprise a metal alloy such as AISI316, Inconel, 253MA or HT800. The membrane may also be produced from porous sintered silicon-nitride $Si_3N_4$, porous silica $SiO_2$, porous alumina $Al_2O_3$, graphite or any other suitable material.

It should be noted that the reaction chamber 16 dimensions may vary from having a maximum transverse dimension of a few millimetres to a few metres.

Figure 2:
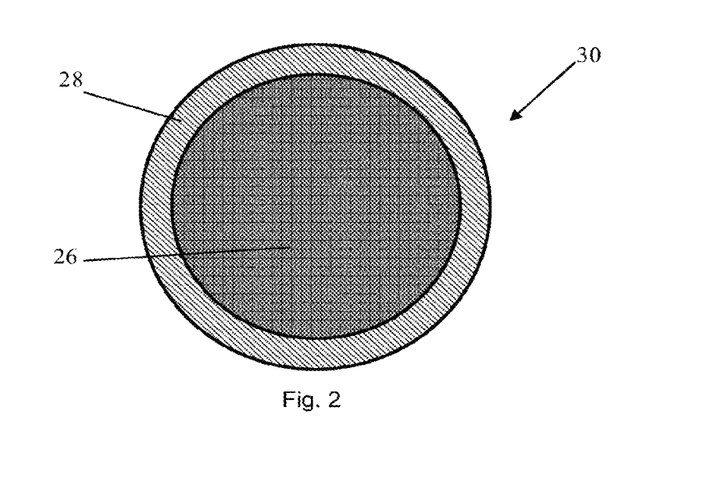
FIG. 2 shows a coated Silicon nitride particle.

The thermal decomposition or reduction of the reactant gases 12 inside the reaction chamber 16 is controlled so as to produce a powder of amorphous, micro- or nano-crystalline Silicon nitride particles which may subsequently form the core region 26 of a coated particle 30 as schematically shown in FIG. 2. The thermal decomposition or reduction of the reactant gases 12 inside the reaction chamber 16 may for example be controlled by adjusting the temperature, pressure, flow rate, heat capacity and/or composition, of the reactant gases 12 (and/or a reaction-influencing gas).

The outer surface of the produced coated or uncoated Silicon nitride particles, which particles may subsequently form a core region 26 of a coated particle 30, is free from irregularities, roughness and projections when viewed at a maximum resolution of a Scanning Electron Microscope (SEM).

The thermal decomposition or reduction of the reactant gases 12 inside the reaction chamber may be influenced by changing at least one of the following characteristics of the reactant gas and/or reaction-influencing gas: temperature, pressure, flow rate, heat capacity, composition, dopant type(s) and/or amount(s), catalyst type(s) and/or amount(s), and/or concentration of one or more components of said gases. By changing at least one of the characteristics of the reactant gases and/or reaction-influencing gas, the thermal decomposition or reduction of the reactant gas inside the reaction chamber, and consequently the formation and/or growth of particles, and/or their morphology and/or crystallinity, may be controlled in order to obtain a final product having the desired characteristics.

For example, the temperature of the primary gas and/or secondary gas may be increased once particles have been formed in order to produce crystalline material. Alternatively the temperature of the primary gas and/or secondary gas may be decreased to produce amorphous material. The amount of hydrogen in the primary gas and/or secondary gas may be increased to decrease the production of nuclei and thereby the total number of particles. The flow rate of the primary gas and/or secondary gas may be increased to promote turbulence inside the reaction chamber, or decreased to reduce turbulence, depending on which conditions are conducive to the production of the desired product.

The primary gas and/or secondary gas preferably has/have a high heat capacity to help provide uniform heating within the reaction chamber. This may however vary with the application since several decomposition reactions include intermediate reversible stages, whereby it may be advantageous to promote particle growth over particle formation. Such stages may be temperature dependent and in such cases a controlled uneven temperature distribution is favourable.

The secondary gas may be supplied through the porous membrane simultaneously with the primary gas, periodically, continuously, intermittently, when desired, or in any combination of these ways during the use of a reactor. The primary gas and the secondary gas may be arranged to be supplied through the same pores, or through different pores in the porous membrane.

It should also be noted that the expressions "primary gas" and "secondary gas" as used in this document need not necessarily mean that said gases comprise just one type of gas. A primary gas and/or a secondary gas may also comprise at least one catalyst gas. Furthermore, different primary gases and/or secondary gases may be used during the use of a reactor.

The actual dimensions of the components of the device 10 (such as the diameter or length of the reaction chamber tube or the shape of the reactor chamber) are not especially critical. In addition, operating parameters such as gas flow rates and operating temperatures can be established experimentally for different devices having different sizes and configurations.

Particles that descended from the bottom of the reaction chamber were collected by installing a collecting container, such as a cylinder having a diameter that was at least twice the size of the diameter of the reactor. The collecting container was located downstream of the reaction chamber and collection was facilitated by the gravitational force on the particles combined with a low gas flow in the exhaust so that the residence time of particles within the collecting container was quite long (i.e. four times the residence time of the particles in the reaction chamber tube. The fallout of the particles was assumed to be enhanced by electrostatic forces as particles piled up on the bottom and the lower walls of the collecting container. It was namely observed that the particles were charged and attracted to each other, and the more the particles that collected in the collecting container, the larger the electrostatic field seemed to be. This enabled the harvesting of particles with a narrow particle size distribution or with particular properties (charged particles).

The method according to the present invention may be used to produce a high volume of powder of particles comprising amorphous, micro- or nano-crystalline Silicon nitride. The method is easy to scale up and it is possible to achieve continuous particle production while the reactor is in use.

According to an embodiment of the invention the powder of amorphous, micro- or nano-crystalline Silicon nitride particles produced in the reactor may be coated with at least one passivating material, such as Carbon or Silicon carbide, using Chemical Vapour Deposition (CVD), such as vertical CVD, Atomic Layer Deposition (ALD), a plasma-assisted method, or a hot wire method or by immersing them in a fluid containing Lithium ions to produce a shell region 28. The shell region 28 may comprise 3-100 monolayers of passivating material so as to be thin but mechanically robust, and/or may be doped with Phosphorus, Boron, Arsenic, Gallium or Aluminium. The coating step may be carried out inside the same reactor used for the production of the core region 26 particles, or inside a different vessel.

According to an embodiment of the invention the method may comprise the step of doping the at least one passivating material with at least one element selected from the group consisting of Phosphorus, Boron, Arsenic, Gallium, and Aluminum. According to an embodiment of the invention the shell region of a coated particle may comprise 3-100 monolayers of the at least one passivating material.

The coated particles 30, which are substantially spherical, which also have a core region 26 that is substantially spherical, and which preferably have a maximum transverse dimension up to 100 µm or 2 nm-10 µm or 10 nm-10 µm or less than 10 µm or less than 1 µm may be used for several applications. The coated particles 30 may for example be used to produce an anode for a Lithium ion battery. By using Silicon nitride instead of Carbon anodes in Lithium ion batteries, or at least replacing part of the Carbon with Silicon nitride, it has been shown that the storage capacity of the battery can be substantially increased.

Figure 3:
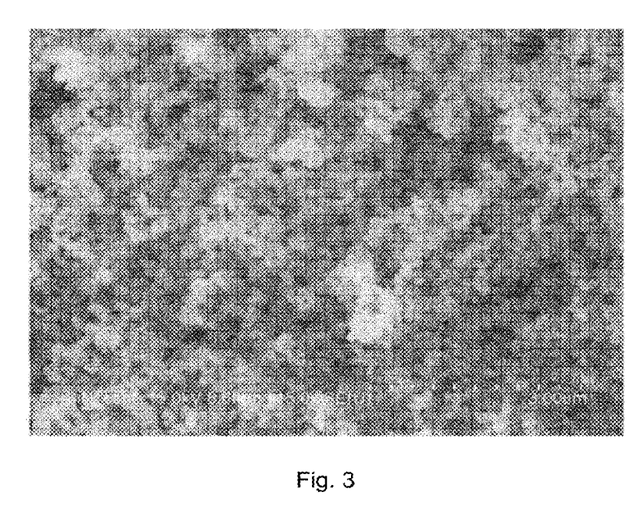
FIG. 3 is a scanning electron microscope (SEM) image of a powder of $SiN_{0.2}$ particles produced using a method according to the present invention.

FIG. 3 shows an SEM image of a powder of substantially spherical $SiN_{0.2}$ particles 26 produced using a method according to the present invention.

Figure 4:
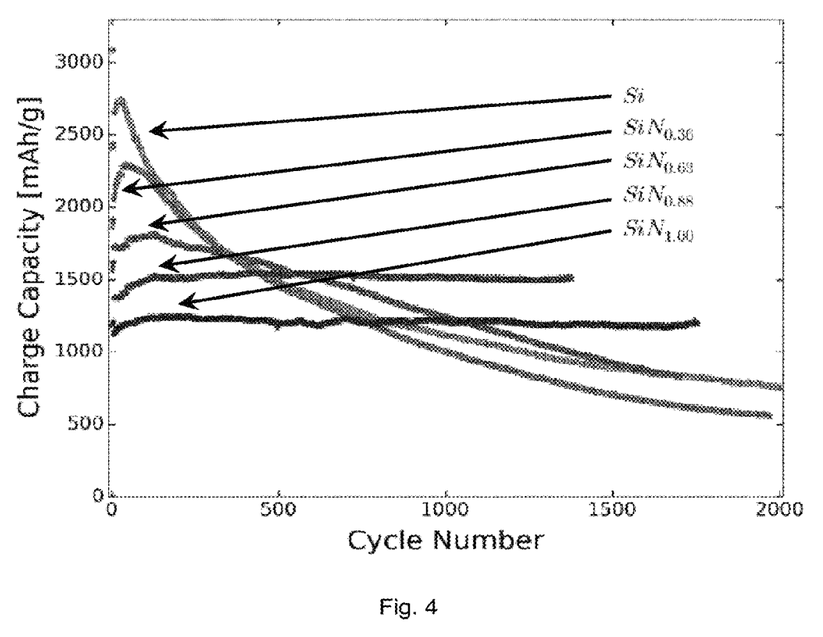
FIG. 4 shows the charge capacity of one Silicon electrode and four electrodes comprising amorphous Silicon nitride with increasing Nitrogen content from x=0.36 to x=1.00.

FIG. 4 shows how the charge capacity of a plurality of Silicon nitride thin film electrodes with different Nitrogen content evolves during cycling. As expected, it can be seen that the initial charge capacity of the electrodes becomes lower as the Nitrogen content increases. However, at a certain threshold value, the material starts to exhibit excellent cycle stability. At this optimal composition, the material has a capacity of approximately 1500 mAh/g and an average coulombic efficiency over the first 1000 cycles of 99.7%. Differential capacity analysis further demonstrates the remarkable cycling stability of the Silicon nitrides having the higher Nitrogen contents.

Amorphous Silicon nitride films were produced made using Plasma Enhanced Chemical Vapor Deposition (PECVD) with silane ($SiH_4$) and ammonia ($NH_3$) as precursors. Films with thicknesses ranging from 40 nm to 200 nm were deposited on Copper foil. Different $SiN_x$ chemical compositions were achieved by varying the ratio of the precursor gases. Transmission Electron Microscopy (TEM) was used in conjunction with spectroscopic ellipsometry and Scanning Electron Microscopy (SEM) to determine the thickness and composition of the films, as well as to evaluate their evenness, coverage and interface quality. Electrochemical testing was conducted in 2032 coin cells against a Lithium metal counter electrode using a commercial separator and an electrolyte with 5% Fluoroethylene Carbonate (FEC) and 1% Vinylene Carbonate (VC).

Figure 5:
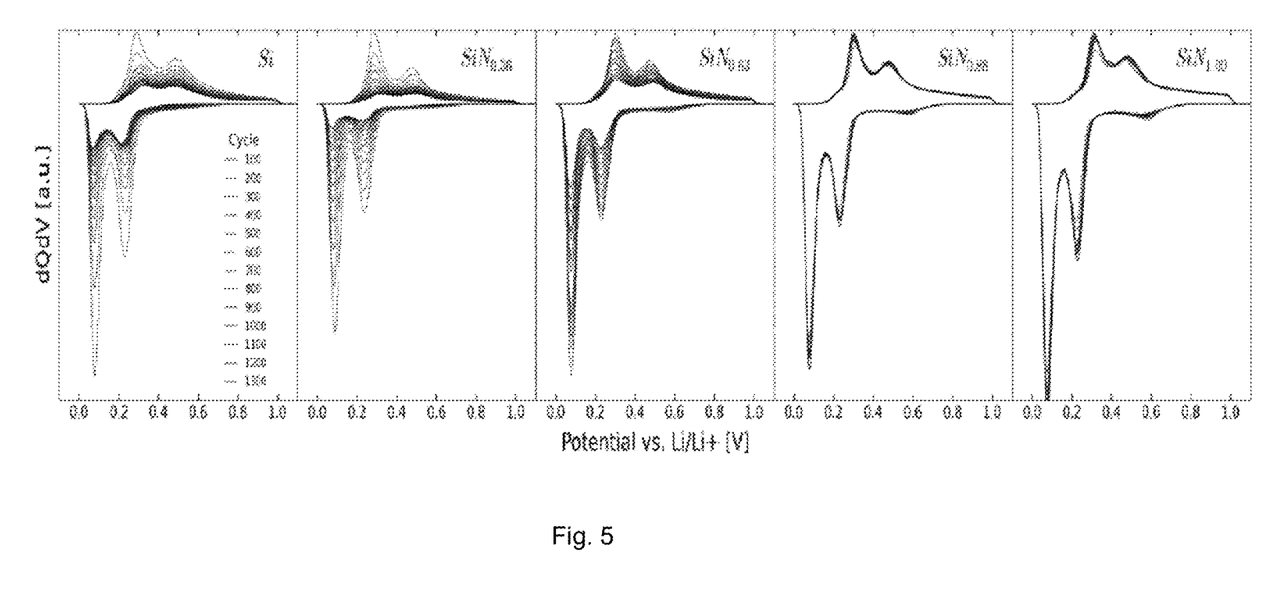
FIG. 5 shows the differential capacity analysis of one Silicon electrode and four electrodes comprising amorphous Silicon nitride with increasing Nitrogen content from x=0.36 to x=1.00.

FIG. 5 shows the charge capacity of one Silicon electrode and four electrodes comprising amorphous Silicon nitride with increasing Nitrogen content from x=0.36 to x=1.00. The composition is estimated from ellipsometry characterization of the thin films. The true Nitrogen content may be somewhat lower if the film contains other sources of band gap modulation, like nano-porosity. An increase in cycle stability between x=0.63 and x=0.88 can be seen. The plots of FIG. 5 show that the rapid degradation of the pure Silicon electrode and the lower nitrides is due to loss of active material. Neither this mode of degradation nor any other can be seen in the two electrodes that contained the most Nitrogen. The similar peak positions for all of the electrodes show that the active part of the electrodes is indeed Silicon, as hypothesized.

Figure 6:
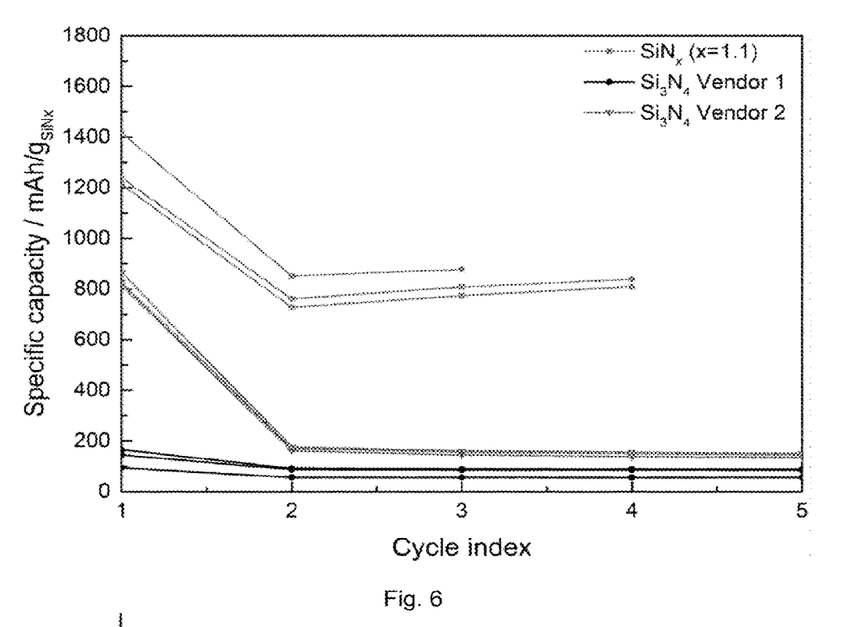
FIG. 6 shows the specific capacity of an electrode according to the present invention compared with the specific capacity of an electrode comprising two commercially available powders.

FIG. 6 shows the specific capacity of an electrode according to the present invention compared with the specific capacity of electrodes comprising commercially available powders which were purchased from two different vendors, Vendor 1 and Vendor 2. The electrode according to the present invention comprised a powder of Silicon nitride particles having a chemical formula of $SiN_{1.1}$ and the commercially available electrodes comprised a powder of Silicon nitride particles having a chemical formula of $Si_3N_4$. The electrodes were only cycled for three to four cycles, but FIG. 6 clearly shows that that the specific capacity of the electrode according to the present invention is better than the specific capacity of the electrodes comprising a commercially available powder.

Figure 7:
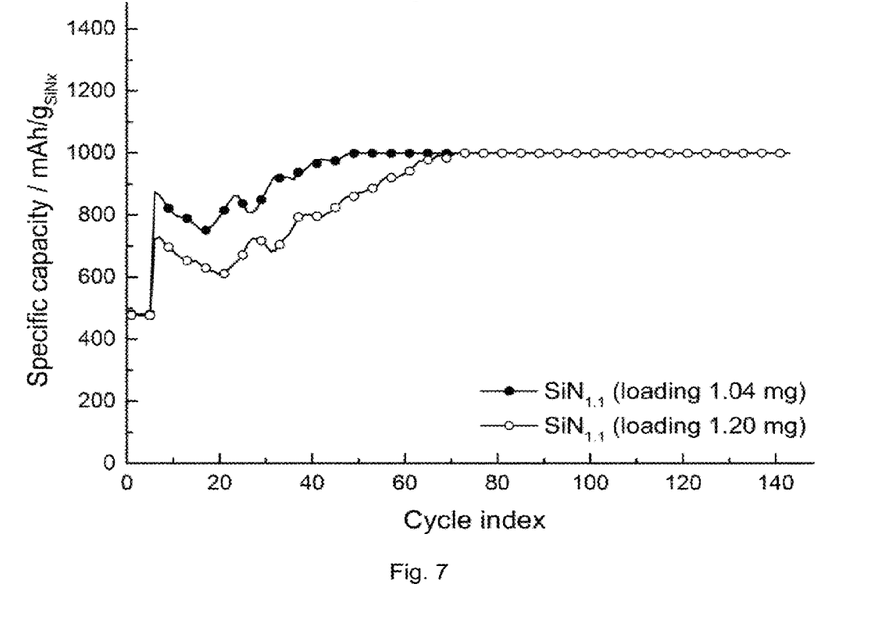
FIG. 7 shows the specific capacity of an electrode according to the present invention compared comprising Silicon Nitride powder having a chemical formula of $SiN_{1.1}$.

FIG. 7 shows the specific capacity of an electrode according to the present invention compared comprising Silicon Nitride powder having a chemical formula of $SiN_{1.1}$. FIG. 7 shows the results from two electrodes that have been cycled with a different regime. The electrodes should have a specific capacity of 1000 mAh/g (of $SiN_x$) and FIG. 7 shows that this specific capacity cannot be met in the initial cycles, indicating that a rearrangement is taking place in the electrode, and that pre-treatment might be necessary. After 60 cycles, the electrodes behave as they should and deliver the desired 1000 mAh/g (of $SiN_x$).

Figure 8:
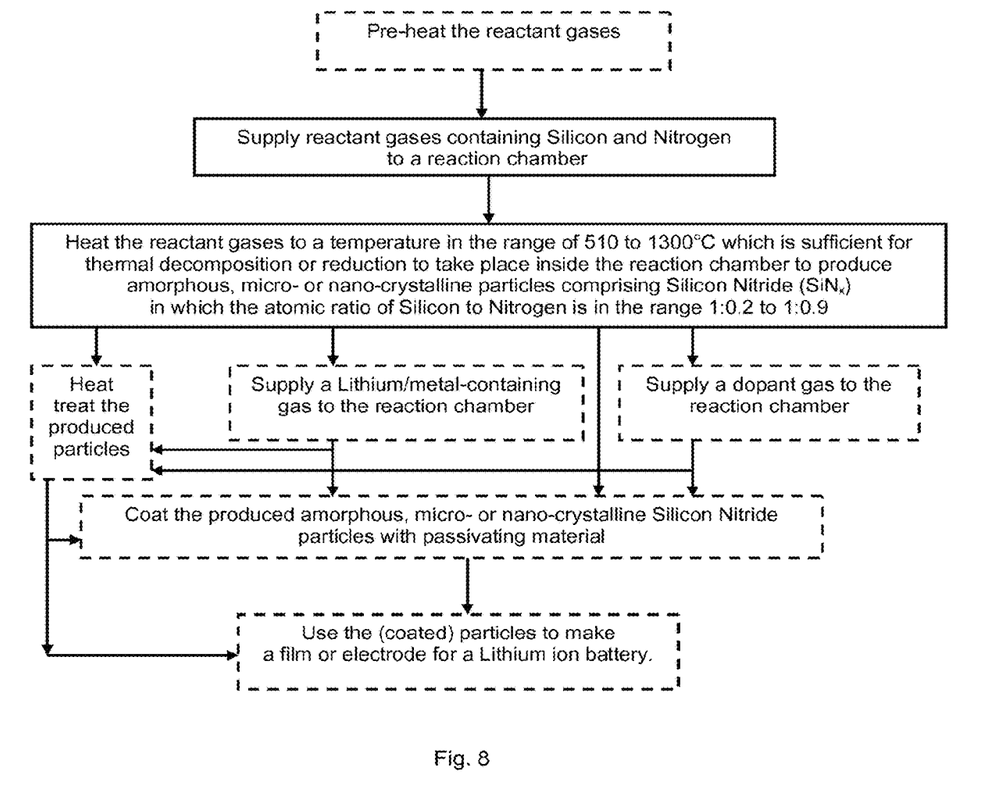
FIG. 8 is a flow chart showing the steps of a method according to an embodiment of the invention.

FIG. 8 is a flow chart showing the steps of a method according to the present invention. The method comprises the steps of supplying reactant gases containing Silicon and Nitrogen to a reaction chamber of a reactor, heating the reactant gas to a temperature sufficient for thermal decomposition or reduction of the reactant gases to take place inside the reaction chamber, such as a temperature in the range of 510 to 1300° C., to thereby produce amorphous, micro- or nano-crystalline particles of Silicon nitride ($SiN_x$) in which the atomic ratio of Silicon to Nitrogen is in the range 1:0.2 to 1:0.9.

Optionally, the method according to the present invention may also comprise one or more of the following steps (which have been illustrated in dashed boxes in FIG. 8): supplying at least one gas containing a metal, such as Lithium to the reaction chamber of the reactor, supplying at least one dopant gas to said reaction chamber of said reactor to dope said particles, coating the produced amorphous, micro- or nano-crystalline Silicon nitride particles with passivating material in the reaction chamber or in a different vessel, using the coated or uncoated amorphous, micro- or nano-crystalline particles comprising Silicon nitride ($SiN_x$) to produce a film or an electrode for a battery, such as a Lithium ion battery.

It should be noted that the steps of supplying reactant gases containing Silicon and Nitrogen to a reaction chamber of a reactor, supplying at least one gas containing a metal, such as Lithium to the reaction chamber of the reactor and supplying at least one dopant gas to said reaction chamber of said reactor to dope said particles do not have to be carried out in a particular sequence. An inert gas boundary is preferably, but not necessarily established before reactant gases and/or a secondary gas are supplied to the reaction chamber.

The method according to the present invention may also comprise at least one of the optional steps of pre-heating the reactant gases to a temperature below the reaction temperature before the reactant gases are supplied to the reaction chamber of the reactor and/or heat treating the particles after their production, in an inert atmosphere or hydrogen-containing atmosphere so as not to oxidise the particles. The post-production heat treatment step may be carried out at a temperature of 600-1300° C. with a process time within 10-3600 seconds in the inert/hydrogen containing atmosphere.

Example 1

A method according to the present invention was carried out by supplying $SiH_4$ and $NH_3$ to a reaction chamber of a Free Space Reactor, and heating these reactant gases to a temperature of 700° C. so that thermal decomposition or reduction of the reactant gases could take place inside the reaction chamber. The effects of the following feed gas compositions were studied: 50% $SiH_4$ and 50% $NH_3$, and 25% $SiH_4$ and 75% $NH_3$. These feed gas compositions were compared with a run in which 100% $SiH_4$ was used.

The nucleation point for 50% $SiH_4$ and 50% $NH_3$ was found to be just below 460° C. at a gas flow rate of 2 standard litres per minute (SLM) and with a residence time of approximately 2 seconds. An exothermal reaction occurred inside the reactor when $SiH_4$ and $NH_3$ reacted. This exothermic reaction occurred between a temperature between 550 and 650° C. More heat seemed to be generated by the exothermic reaction when 25% $SiH_4$ and 75% $NH_3$ were used than in the case when 50% $SiH_4$ and 50% $NH_3$ were used. More heat was generated when using a mixture of $SiH_4$ and $NH_3$ than when using 100% $SiH_4$. Operation below the exothermic reaction temperature is likely to result in low Nitrogen content.

Samples of the produced Silicon nitride ($SiN_x$) particles where taken from the floor of the reactor, the reaction chamber, from a filter inside the reactor and from a wall in the reactor exhaust, and analysed using SEM and an Energy-dispersive detector (EDS) to determine the Nitrogen content of the produced particles.

It was found that an increase in the total gas flow through the reactor decreased the growth rate of particles on the wall of the reaction chamber.

Example 2

A method according to the present invention was carried out by supplying $SiH_4$ at a gas flow rate of 1 SLM and $NH_3$ at a gas flow rate of 1 SLM to a reaction chamber of a Free Space Reactor, and heating these reactant gases to a temperature of 700° C. so that thermal decomposition or reduction of the reactant gases could take place inside the reaction chamber.

The total gas flow through the reaction chamber was 2 SLM and the residence time of gas in the reaction chamber was approximately 2 seconds. This gave a high yield (of about 90%) of nano-crystalline $SiN_{0.2}$ particles. However, the reaction chamber tube got clogged up after 46 minutes after 78.5 litres of $SiH_4$ had passed through the reactor Most of the powder produced was deposited on the wall in the reaction chamber and the produced powder was dark brown in colour.

Example 3

A method according to the present invention was carried out by supplying $SiH_4$ at a gas flow rate of 1 SLM and $NH_3$ at a gas flow rate of 3 SLM to a reaction chamber of a Free Space Reactor, and heating these reactant gases to a temperature of 690° C. so that thermal decomposition or reduction of the reactant gases could take place inside the reaction chamber. The total gas flow through the reaction chamber was 4 SLM and the residence time of gas in the reaction chamber was approximately 2 seconds. This gave a medium yield (of about 70%) of nano-crystalline $SiN_{0.3}$ particles. The reaction chamber tube did not clog up even after 193 litres of $SiH_4$ had passed through the reactor. The colour of the powder produced was similar to the colour of oxidized iron (rust).

The material growth on the wall in the reaction chamber was monitored using a charge-coupled device (CCD) camera. The reactor was flushed with Argon every 30 minutes to get a clear view of the inside of the reactor chamber. It was found that $SiN_{0.3}$ particles accumulated in the lower part of the reactor's exhaust stream.

It was found that that the produced nano-crystalline $SiN_{0.3}$ particles contained approximately 50 atomic-% Nitrogen. It was also found that increasing the $NH_3/SiH_4$ gas flow ratio resulted in particles containing more Nitrogen. Increasing the total gas flow rate reduced reactor wall growth.

Example 4

The residence time in the reaction chamber, the temperature, the pressure, and the gas mixture ratio between silane and ammonia is in a range which triggers a reaction between the gases to create solid silicon nitride ($SiN_x$) where $0.2 \leq x < 1.0$. The temperature may be between 510° C. and 1300° C., or between 600° C. and 1000° C., the pressure may be 0.1 to 10 bar (to ensure high throughput production), the gas composition comprises at least 10% of each constituent gas (silane, ammonia) and the residence time may be from 0.1 to 10 seconds.

It has been found that most of the reactions in the reactor take place in a length that is less than the diameter of the reaction chamber tube.

Example 5

Pre-lithiating the particles may be achieved by supplying at least one gas containing Lithium to the reaction chamber. In addition to a gas flow rate of 1 SLM of $SiH_4$ and 3 SLM of NH3, one may supply a gas flow rate of 1 SLM of lithium trimethylsilane to the chamber of a Free Space Reactor, and heat these reactant gases to a temperature so that thermal decomposition or reduction of the reactant gases could take place inside the reaction chamber. The produced nanoparticles may contain approximately 33 atomic-% Nitrogen, 33 atomic-% Silicon and 33 atomic-% Lithium.

Further modifications of the invention within the scope of the claims would be apparent to a skilled person.

The invention claimed is:

1. A battery anode material comprising:
   a silicon nitride powder comprising a plurality of particles;
   wherein each of the plurality of particles has a core region comprising silicon nitride and optionally a shell region comprising at least one passivating material;
   wherein the atomic ratio of silicon to nitrogen in the core region is 1:X;
   where X is in a range of $0.2 \leq X \leq 0.9$; and
   wherein the silicon nitride in the core region has a nanocrystalline morphology.

2. The battery anode material of claim 1 wherein X is in a range of $0.4 \leq X < 0.8$.

3. The battery anode material of claim 1 further comprising:
an element included in the silicon nitride powder selected from the group consisting of a metal, oxygen, and carbon.

4. The battery anode material of claim 1, wherein the shell region is present, and the passivating material is selected from the group consisting of carbon and silicon carbide.

5. The battery anode material of claim 1, wherein the lithium content in the core region is less than or equal to 350 atomic-percent of the core silicon content.

6. The battery anode material of claim 1 wherein the silicon nitride powder is formed of particles having a homogeneous size and spherical shape.

7. The battery anode material of claim 1 wherein the silicon nitride powder includes a dopant selected from the group consisting of phosphorous, boron, arsenic, gallium, and aluminum.

\* \* \* \* \*